Nov. 8, 1932.  J. BAGGIOLINI  1,887,080
ROLLING AND LOADING HAYRAKE
Filed Jan. 23, 1931   2 Sheets-Sheet 1
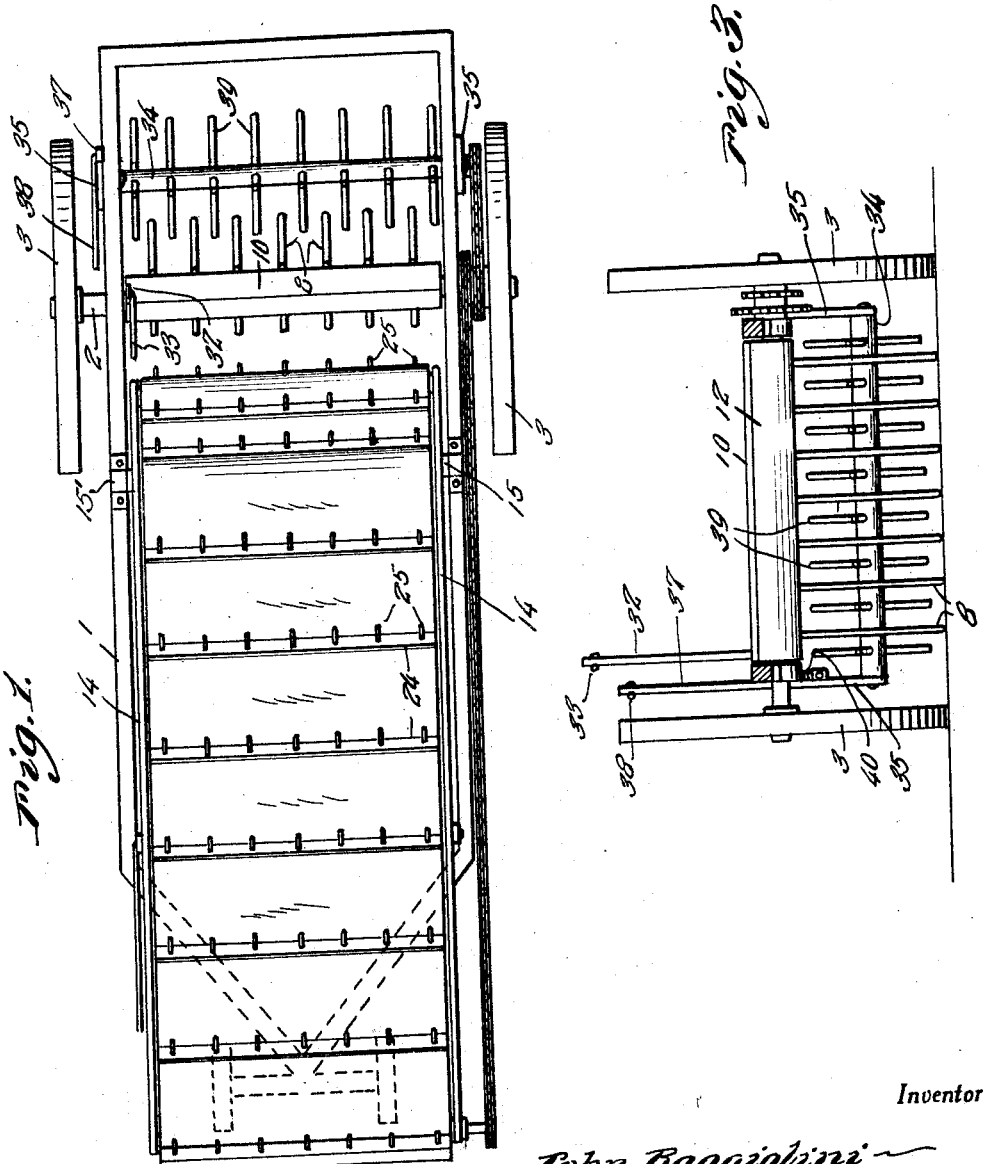
Inventor
John Baggiolini
By Clarence A. O'Brien
Attorney

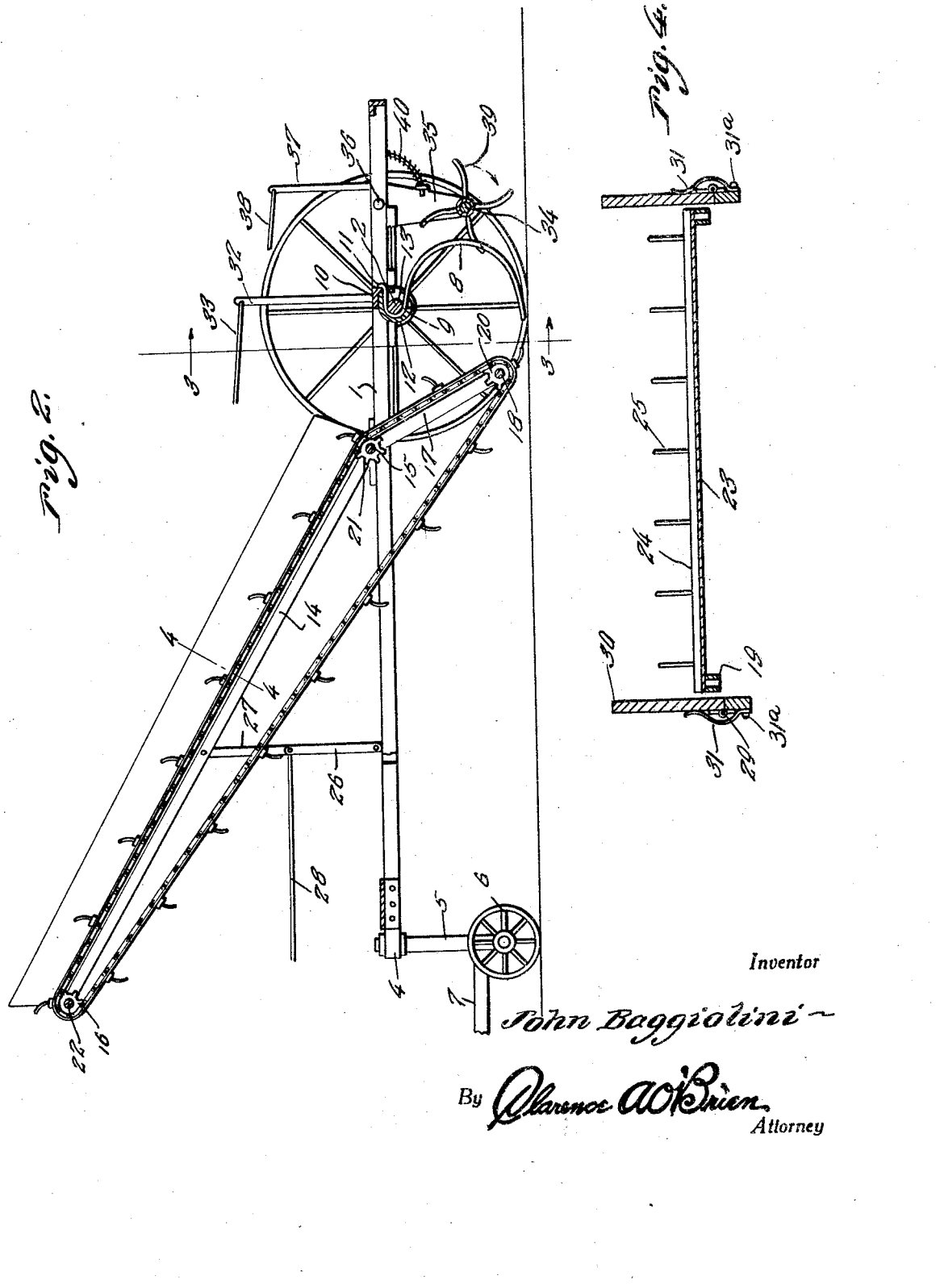

Patented Nov. 8, 1932

1,887,080

UNITED STATES PATENT OFFICE

JOHN BAGGIOLINI, OF SOLEDAD, CALIFORNIA

ROLLING AND LOADING HAYRAKE

Application filed January 23, 1931. Serial No. 510,794.

This invention relates to a rolling and loading hay rake, and the primary object of this invention is to provide a structure of the character set forth capable of use as a trailer and adapted to be driven by the hay wagon.

A still further object of the invention is to provide a trailer for hay wagons that includes means for raking the hay and subsequently loading the raked hay on to the wagon.

Other objects and advantages of the invention will become apparent during a study of the following description taken in connection with the accompanying drawings wherein:

Figure 1 is a top plan view of the loading hay rake.

Figure 2 is a longitudinal sectional view therethrough.

Figure 3 is a vertical transverse sectional view taken substantially on the line 3—3 of Figure 2.

Figure 4 is a transverse sectional view taken substantially on the line 4—4 of Figure 2.

With reference more in detail to the drawings, it will be seen that 1 indicates a frame supported at its rear end on a transverse axle 2, the latter having tread wheels 3 journalled on the ends thereof.

Opposite side members of the frame adjacent the forward end of the frame merge toward one another and at their converging ends terminate in a bearing 4 in which is suitably journalled the shank 5 of a dirigible wheel assembly 6, the latter including a suitable draft tongue 7 whereby the frame may be suitably coupled to the hay wagon.

Suitably supported in the frame adjacent the rear end thereof is a rake structure that includes a plurality of tines 8 that are arranged in relatively spaced relation and are curved longitudinally in the direction of travel of the wheeled frame. Each of the tines 8 at its upper end is bent in the form of a U as at 9 and embraces the axle 2. Extending transversely of the frame slightly rearwardly of the axle 2 is an angle bar 10 that has a vertical flange thereof provided with spaced apertures for accommodating the terminals 11 of the U-shaped extremity 9 of the tines. A substantially cylindrical retainer 12 is suitably disposed about the axle 2 and is engageable with the U-shaped extremities 9 for securing the latter embraced about the axle 2. The member 12 is split longitudinally, and one longitudinal edge thereof engages the vertical flange of the angle bar 10, while the opposite longitudinal edge of the member 12 is provided with a plurality of longitudinally spaced notches 13 for accommodating the tines 8. (See Figure 2.)

An endless conveyor comprises a pair of spaced parallel side members 14 rockably mounted at their rear ends on a transverse shaft 15 journalled in brackets 15' forwardly of axle 2. Journalled between the forward ends of the side bars 14 is a shaft 22, while at their rear ends the sides 14 terminate in downwardly and rearwardly extending extensions 17 between the free ends of which is journalled a shaft 18. Endless side chains 19 are trained over sprockets 20 provided on opposite ends of shaft 18, sprockets 21 provided on opposite ends of shaft 15, and sprockets 16 provided on opposite ends of shaft 22. Extending between the chains 19 and movable therewith is a canvas belt 23 provided with relatively spaced transverse cleats 24 respectively provided with longitudinally spaced conveyor teeth 25.

Links 26 are pivoted at one end to opposite sides of frame 1, and at their free ends pivoted to links 27, the latter in turn being pivoted to the side members 14. Flexible elements 28 at one end are operatively connected with the links 26 and 27 at the interconnected ends of the links.

When links 26 and 27 are in the vertical position or in the position shown in Figure 2 it will be seen that the endless conveyor or elevator will be arranged at a desired angle so that the uppermost end of the elevator or conveyor will be disposed above the wagon box of a wagon. Obviously then as the device is drawn along behind the hay wagon, hay gathered by the tines 8 will be received on the endless conveyor and conveyed upwardly and forwardly to discharge from the conveyor or elevator into the wagon box of the hay wagon.

When the device is not in use, by exerting a suitable pull on elements 28, links 26 and 27 will swing relative to one another whereby to permit of a lowering of the endless conveyor or elevator.

Each of the side members 14 has hingedly connected thereto as at 29 longitudinally extending side extensions or boards 30 normally maintains in an upright position through the medium of suitable springs 31. Springs 31 at one end are pivotally mounted on sides 14 as at 31a and may be swung to an out of the way position to permit side boards or extensions 30 to swing outwardly and away from the elevator apron.

Angle bar 10 is pivotally mounted between opposite sides of frame 1, and at one end is provided with a lever 32 through the upper end of which is suitably connected a pull cord 33. By exerting a pull on the cord 33 in the proper direction, the tines 8 may be rotated about the axle 2 for moving the lower end of the tines upwardly and rearwardly out of active position.

A cleaning roller 34 is suitably journalled between the lower ends of hangers 35 disposed rearwardly of the tines 8. Hangers 35 at their upper ends are pivotally engaged with opposite side members of frame 1 as at 36, and one of the hangers 35 has suitably connected therewith a lever 37 with which is also engaged a pull cord 38 for swinging the hangers 35 about their pivots whereby to position the cleaning roller 34 in operative position with respect to tines 8. The cleaning roller 34 is provided with longitudinally spaced series of cleaning fingers 39, and the purpose of this roller is to free the tines 8 of hay that may become clogged between the tines.

Hangers 35 are normally maintained in vertical position through the medium of suitable resilient means 40.

In actual practice, draft tongue 7 may be suitably coupled to the rear end of a hay wagon, and the parts positioned as suggested in Figure 2. As the wagon moves over the ground, drawing the combined rake and loader, it will be apparent that the hay will be raked by the tines 8, and subsequently gathered on the endless elevator to be carried upwardly and forwardly to finally be loaded into the wagon box of the hay wagon.

Even though I have herein shown and described the preferred embodiment of the invention, it is to be understood that the same is susceptible of changes, modifications and improvements coming within the scope of the appended claims.

Having thus described my invention, what I claim as new is:

1. A combined hay rake and loader capable of use as a trailer for a hay wagon and including in combination a wheel supported frame, a rake including a plurality of tines mounted transversely of the frame adjacent the rear end thereof and having its tines capable of swinging movement about a horizontal axis, a cleaning roller for the tines mounted rearwardly thereof transversely of the frame, pivotally mounted means for supporting the roller and including means for moving the roller into and out of operative position with respect to the tines, an endless conveyor rockably mounted adjacent one end thereof in advance of said rake, said conveyor at said one end provided with a downwardly and rearwardly inclined extension, and means engageable with the wheel supported frame and the frame of said conveyor for supporting the latter at an angle to the perpendicular.

2. In a device of the character described, in combination, a rake, a pair of opposed pivotally mounted arms, a cleaning wheel for the rake rotatably supported between said arms, spring means normally urging said arms to rotate in a direction toward the rake and means for rotating said arms against the action of said spring means.

3. A hay raking and loading device comprising in combination a wheel supported axle, a notched member extending parallel to the axle and spaced therefrom, a plurality of tines having end portions bent about the axle and engaging the notches of said member, and a retaining member disposed concentric to said axle and engaging said ends of the tines.

In testimony whereof I affix my signature.

JOHN BAGGIOLINI.